(12) United States Patent
Mak

(10) Patent No.: US 9,497,934 B2
(45) Date of Patent: Nov. 22, 2016

(54) PET TOY WITH INTEGRAL NOISE MAKING MODULE

(71) Applicant: The KONG Company, LLC, Golden, CO (US)

(72) Inventor: Dominic Mak, Kowloon (HK)

(73) Assignee: THE KONG COMPANY, LLC, Golden, CO (US)

( * ) Notice: Subject to any disclaimer, the term of this patent is extended or adjusted under 35 U.S.C. 154(b) by 345 days.

(21) Appl. No.: 14/180,518

(22) Filed: Feb. 14, 2014

(65) Prior Publication Data

US 2015/0230429 A1      Aug. 20, 2015

(51) Int. Cl.
*A01K 15/00*     (2006.01)
*A01K 11/00*     (2006.01)
*A01K 15/02*     (2006.01)

(52) U.S. Cl.
CPC ........... *A01K 15/026* (2013.01); *A01K 15/025* (2013.01)

(58) Field of Classification Search
CPC ... A01K 15/00; A01K 15/025; A01K 15/026
USPC .................. 119/702, 707; 446/188, 213, 216
See application file for complete search history.

(56) References Cited

U.S. PATENT DOCUMENTS

| | | |
|---|---|---|
| 3,943,643 A | 3/1976 | Fisher et al. |
| 4,223,636 A | 9/1980 | Dishong |
| 4,399,632 A | 8/1983 | Iseki |
| 4,534,316 A | 8/1985 | Bowlsby |
| 4,571,208 A | 2/1986 | Saigo et al. |
| 4,973,286 A | 11/1990 | Davison |
| 5,078,637 A | 1/1992 | McFarland |
| 5,758,604 A | 6/1998 | J.o slashed.rgensen |
| 6,014,950 A | 1/2000 | Rogers |
| 6,110,001 A | 8/2000 | Chae |
| 6,112,703 A | 9/2000 | Handelsman |
| 6,123,599 A | 9/2000 | Chiang |
| 6,216,640 B1 | 4/2001 | Zelinger |
| 6,360,693 B1 | 3/2002 | Long, III |
| 6,439,950 B1 | 8/2002 | Goldman et al. |
| 6,470,830 B2 | 10/2002 | Mann |
| 6,557,494 B2 | 5/2003 | Pontes |

(Continued)

FOREIGN PATENT DOCUMENTS

WO    WO 03/079807    10/2003

OTHER PUBLICATIONS

International Search Report and Written Opinion for International Patent Application No. PCT/US2011/055860 mailed Jan. 13, 2012, 10 pages.

*Primary Examiner* — Richard Price, Jr.
(74) *Attorney, Agent, or Firm* — Sheridan Ross PC

(57) ABSTRACT

A pet toy has an integral noisemaking module or assembly. The module is located within an interior cavity of the pet toy. The module defines an internal protective housing with at least one noisemaking element mounted within the module, such as a squeaker. The squeaker is mounted to a position in the module that results in the squeaker being placed in a protected and offset location as compared to the exterior surface of the toy. Multiple noisemaking elements can be mounted in the module to produce different types of sounds and volumes of sounds. Variable forces placed on the pet toy result in different sounds produced by the noisemaking elements. For example, each noisemaking element may have a different threshold air flow requirement in order to produce sound.

25 Claims, 3 Drawing Sheets

(56) References Cited

U.S. PATENT DOCUMENTS

| | | |
|---|---|---|
| 6,609,944 B1 | 8/2003 | Viola |
| 6,663,457 B2 | 12/2003 | Ritchey |
| 6,679,927 B2 | 1/2004 | Strongin |
| 6,786,792 B2 | 9/2004 | Ritchey |
| 6,892,674 B1 * | 5/2005 | Dubinins et al. .... A01K 15/026 119/702 |
| 6,935,274 B1 | 8/2005 | Rothschild |
| 6,981,471 B1 | 1/2006 | Dubinins et al. |
| 7,063,044 B2 | 6/2006 | Handelsman et al. |
| 7,066,779 B2 | 6/2006 | Willinger |
| 7,100,539 B2 | 9/2006 | Levan |
| 7,144,293 B2 | 12/2006 | Mann et al. |
| 7,169,008 B2 | 1/2007 | Ritchey |
| 7,201,117 B2 | 4/2007 | Ritchey et al. |
| 7,207,294 B2 | 4/2007 | Stasio |
| 7,264,533 B2 | 9/2007 | Chan et al. |
| D552,307 S | 10/2007 | Renforth et al. |
| 7,343,878 B2 | 3/2008 | Ritchey et al. |
| 7,363,880 B2 | 4/2008 | Ritchey et al. |
| 7,455,033 B2 | 11/2008 | Curry |
| 7,513,220 B2 | 4/2009 | Ragonetti et al. |
| 7,574,977 B2 | 8/2009 | Ritchey |
| 7,587,993 B2 | 9/2009 | Jager |
| 7,597,065 B2 | 10/2009 | Jager |
| 7,600,488 B2 | 10/2009 | Mann |
| 7,644,684 B2 | 1/2010 | Ritchey |
| 7,665,423 B2 | 2/2010 | Ritchey et al. |
| 7,722,428 B2 | 5/2010 | Di Lullo |
| 7,736,212 B2 | 6/2010 | Willinger |
| 7,736,213 B2 | 6/2010 | Willinger et al. |
| 7,762,214 B2 | 7/2010 | Ritchey |
| 7,810,455 B2 | 10/2010 | Axelrod et al. |
| 7,833,079 B2 | 11/2010 | Willinger et al. |
| 7,950,353 B2 | 5/2011 | Axelrod et al. |
| 8,235,762 B2 | 8/2012 | Rutherford et al. |
| 2005/0227572 A1 | 10/2005 | Ritchey |
| 2007/0283900 A1 | 12/2007 | Jager |
| 2009/0038559 A1 | 2/2009 | Markham |
| 2009/0038560 A1 | 2/2009 | Markham |
| 2012/0090554 A1 | 4/2012 | Nunn et al. |

* cited by examiner

PET TOY WITH INTEGRAL NOISE MAKING MODULE

FIELD OF THE INVENTION

The invention relates to pet toys with noisemaking features, and more particularly, to a pet toy having a noise-making module or assembly that is able to produce multiple different sounds according to the manner in which an animal interacts with the pet toy. The invention also relates to a method of producing multiple different sounds in a pet toy having the noisemaking module or assembly.

BACKGROUND OF THE INVENTION

Pet toys having noisemaking devices, commonly referred to as "squeakers", are well known. Most pet toys incorporating squeakers are made from a flexible elastomeric material, such as rubber, plastic, and various formulations thereof. When the animal chews on the toy, a hollow cavity or interior of the toy is deflected such that air is forced through the squeaker device, thereby producing a sound.

There are some problems associated with squeakers placed in pet toys. One problem is that squeakers can become exposed as an animal continually chews on the toy. One natural behavior for many animals is to make an attempt to "kill" the toy by chewing through the material of the toy in order to access and bite on the squeaker. In some cases, the animal may inadvertently aspirate the squeaker along with parts of the toy, which can result in choking Another problem associated with squeakers is that an animal may lose interest in the toy because the squeaker makes a single sound which fails to stimulate the animal over time. Another problem associated squeakers is that the squeaker itself can become damaged and therefore inoperable when the animal applies pressure to an area overlying the squeaker, and even if the animal does not bite directly on the squeaker. In cases such as this, the squeaker is not adequately protected from indirect forces applied by the animal as the animal bites or chews on the toy.

Therefore, there is still a need to provide a pet toy incorporating a squeaker in which the squeaker is maintained in a protected position within the toy. There is yet further a need to provide a pet toy in which the squeaker has the capability to produce multiple sounds, which may encourage greater interaction with the animal over a longer period of time. There is also need to provide a pet toy design in which more than one squeaker can be used as a redundant feature for noisemaking purposes if one of the squeakers becomes damaged and inoperable.

SUMMARY OF THE INVENTION

A pet toy is provided having an integral noisemaking module or assembly. The module is located within an interior cavity of the pet toy. The module has a housing, and at least one squeaker disposed within the housing. The squeaker is mounted to a wall of the module that is offset or separated from the outer surfaces of the toy, which results in the squeaker being placed in a protected location when an animal contacts the outer surfaces of the toy. Accordingly, pressure placed against the outer surfaces of the pet toy will not result in damage to the squeaker because the squeaker remains in a protected position that prevents forces from being transferred to the squeaker from deflection of the outer surfaces in most circumstances. Further, the housing of the module keeps the squeaker in a supported position so that air may be evacuated from and pass back into the module as an animal bites/chews and then releases the toy.

In a preferred embodiment, the squeaker is mounted against a top or opposite wall of the module housing as compared to the outer surface of the toy where the module is located. Further, the squeaker is placed within a protective cover disposed within the housing as an additional protective feature for the squeaker.

Also in the preferred embodiment, the module may incorporate two or more squeakers mounted within respective protective covers. Multiple squeakers provide options for producing different types of sound that may better stimulate the animal.

The pet toy is preferably made from a flexible, elastomeric material so that when an animal bites or chews on the toy, the exterior surface of the toy can deflect resulting in a change of shape in the interior cavity or chamber of the toy. As the exterior surface of the pet toy is deflected, air is forced to flow through one or more squeakers mounted in the module housing and through a vent opening in the module housing causing the squeaker(s) to produce sound. As the animal releases pressure against the exterior surface of the toy, the interior cavity of the toy re-inflates, thereby causing air to pass in a reverse direction through the squeaker(s) back into the interior cavity, and causing production of a second different sound.

For an embodiment of the invention that includes a pair of squeakers, the squeakers can be selectively sized such that the squeakers each produce different sounds, both when the toy is compressed and when the toy re-inflates. For example, one of the squeakers may have a larger interior passageway, with a reed of a first size, and the other squeaker may have a smaller interior passageway, with a reed of a second different size. When the animal bites down and compresses the toy, one or both of the squeakers may produce a sound by a sufficient volume and speed of air traveling through the interior passageways of the squeakers to thereby vibrate the respective reeds producing multiple sounds of different pitch/tone. The number of squeakers activated is dependent upon the amount of force applied to the toy. Further, the particular combination of tones produced is also dependent upon the amount of force applied to the toy. Assuming that sufficient and differential forces are applied to the toy, at least four different and unique tones can be produced: two tones caused by air flowing through the respective pair of squeakers when the toy is compressed, and two additional tones caused by air flowing back through the respective pairs of squeakers when the toy re-inflates. In addition to control of different combinations of tones, the volume of sound produced by the squeakers may also be selectively controlled by choosing squeakers with designs that produce variable sound volumes based upon the flow rate of air traveling through the squeakers.

The flexible and elastomeric body of the pet toy can be described as functioning similar to a bellows device and reverse bellows device to produce sound. More particularly, the types of sounds produced by the squeakers depend upon the amount of force applied to the body of the pet toy, which in turn affects the volume and flow rate of air moving through the squeaker module. A smaller volume of air passing through the squeaker module by lightly depressing the body of the toy may activate only one of the squeakers to produce a first tone. As the previous, lightly depressed body of the pet toy re-inflates, air passes back through the module housing in a reverse direction, thereby producing a second different tone. A larger volume of air moving at a higher flow rate through the squeaker module by more forcefully depressing the body of the toy may activate both squeakers to produce a third tone, which is a combination of tones emitted from both of the squeakers. As the previous, more forcefully depressed cavity of the pet toy re-inflates, air passes back through the squeaker module in the reverse direction thereby producing yet a different fourth tone, which is a combination of tones emitted from both of the squeakers.

The exterior shape of the toy can be selected to accommodate an interior cavity of sufficient size that allows sufficient volume of air to pass through the squeaker module for effectively activating the squeakers to produce sound. In one example, the toy could be shaped like a turtle in which the turtle shell forms most of the exterior surface of the toy. The gap or space within the shell defines the interior cavity which is of sufficient size to house the squeaker module and to produce a flow of air when compressed to active the squeaker(s).

In another aspect of the invention, the outer surfaces of the pet toy may include a plurality of irregular protrusions that may assist with dental cleaning of an animal's teeth and gums when the animal bites and chews. Channels or gaps between the protrusions can be loaded with paste like treats in order to further stimulate the animal.

The material chosen for the squeaker module may also be flexible and elastomeric, which therefore allows the squeaker module to deflect in a manner responsive to pressure applied by the bite of an animal. It is also contemplated that the material for the squeaker module may be slightly stiffer than the material for the body of the toy, thereby providing some amount of additional protection for the squeaker(s) mounted within the squeaker module.

Additional features and advantages of the invention will become apparent from review the following detailed description, taken in conjunction with the accompanying drawings.

DETAILED DESCRIPTION

Figure 1:
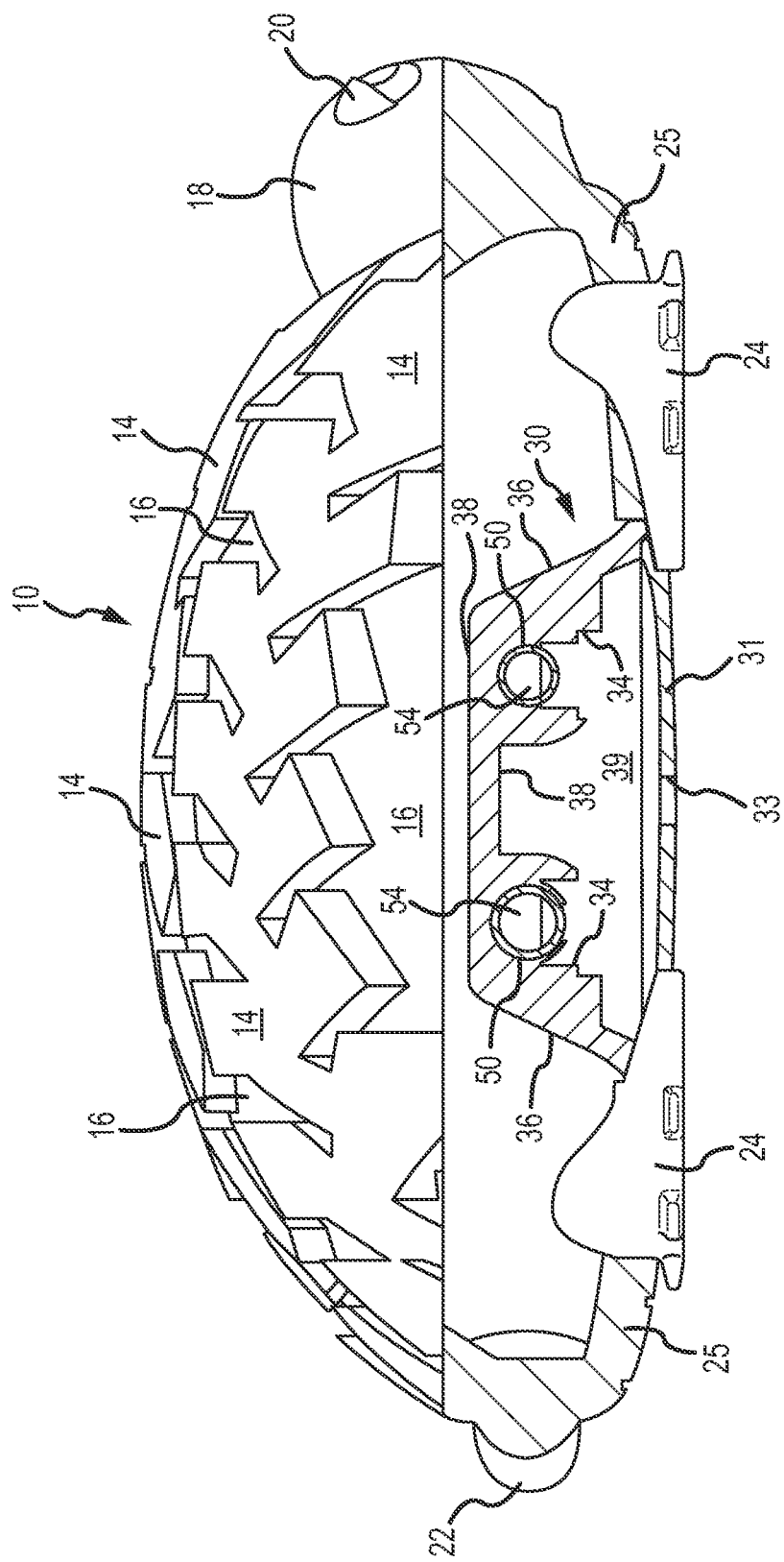
FIG. 1 is a fragmentary cross-sectional side view of an embodiment of the invention.

Referring to FIG. 1, the pet toy 10 is shown from an elevation or side view, and the lower portion or half is shown in cross section to better illustrate interior details. The exterior or outer surface of the pet toy is shown in the shape of a turtle having a body 12, a head 18, eyes 20, a tail 22, and feet/legs 24. The body 12 depicts a shell of the turtle, and the shell has a number of features that can be used to facilitate dental cleaning as an animal bites and chews on the toy. As shown, the body/shell 12 has a plurality of irregular protrusions 14 and a plurality of grooves or channels 16 defining the gaps or spaces between the protrusions 14. Contact of an animal's teeth and gums across the protrusions may facilitate the dental cleaning The grooves 16 can be loaded with dental cleaning products such as toothpaste. Alternatively, the grooves 16 can be loaded with paste-like treats, such as peanut butter.

Figure 2:
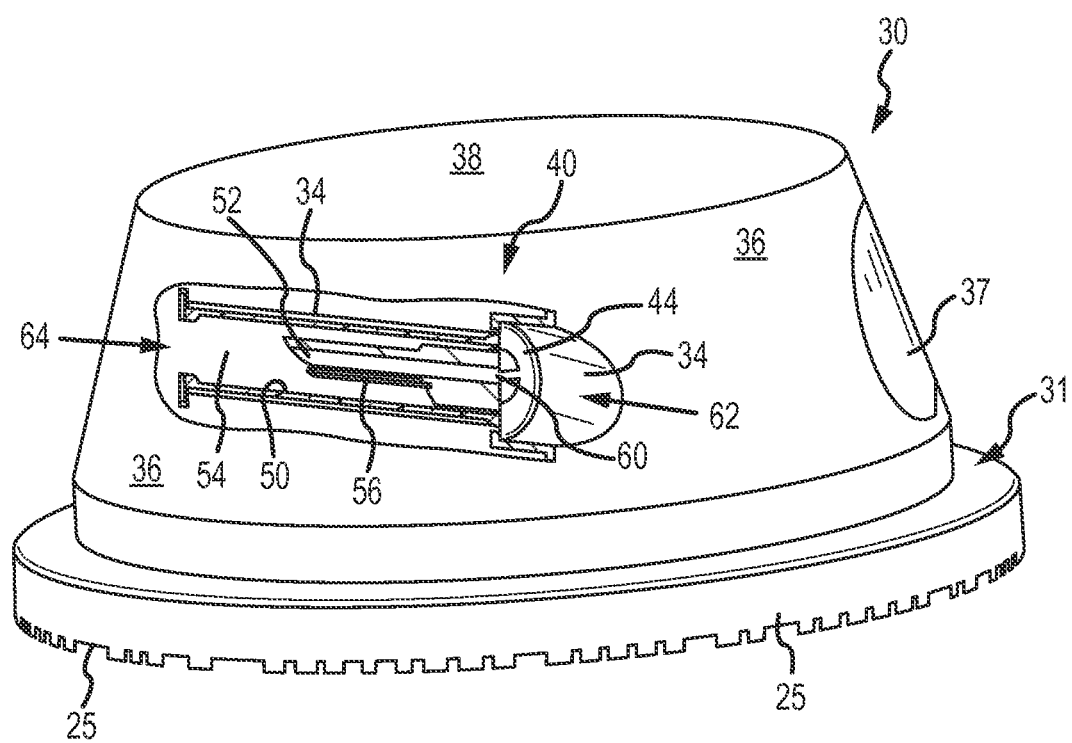
FIG. 2 is an enlarged fragmentary perspective view of the squeaker module and a squeaker mounted in the squeaker module.
Figure 4:
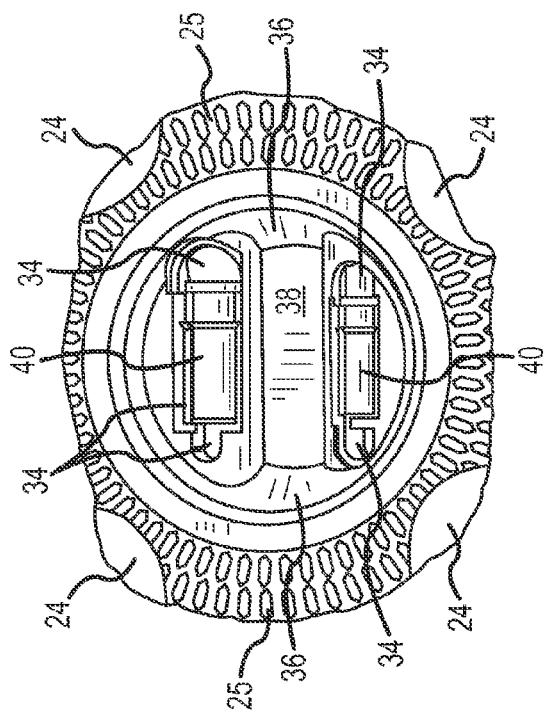
FIG. 4 is another bottom plan view of the squeaker module mounted to the pet toy with the bottom cover of the squeaker module removed and also protective channel covers removed thereby exposing a pair of squeakers mounted against a top or opposite wall of the squeaker module.
Figure 3:
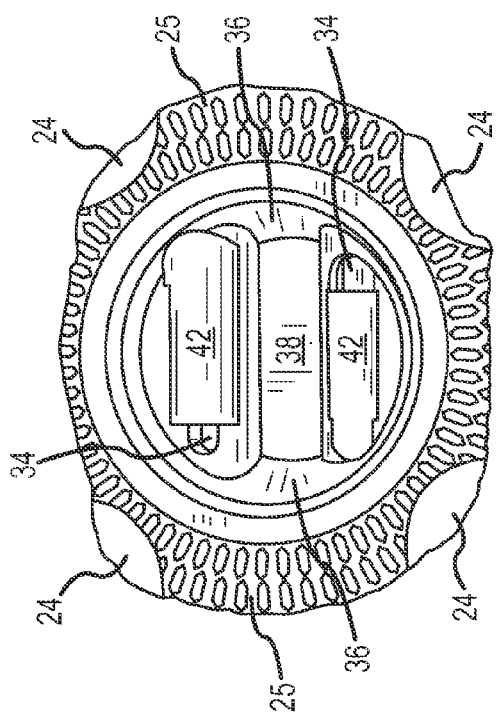
FIG. 3 is a bottom plan view of the squeaker module mounted to the pet toy, with a bottom cover of the squeaker module removed thereby exposing components of the squeaker module.

Referring also to FIGS. 2-4, the lower portion of the pet toy 10 includes a bottom surface 25, the plurality of feet/legs 24, and a bottom cover 31 of a noisemaking module 30. The noisemaking module 30 defines a housing or enclosure for one or more noisemaking elements 40, such as a squeaker. The module 30 is more particularly shown as having a sidewall 36 and an opposite or top wall 38. The bottom cover 31, sidewall 36, and top wall 38 define an interior chamber 39 within the module 30. The toy itself has an interior open space or interior cavity 26.

A compression force applied to the pet toy that deflects or deforms the exterior surface of the pet toy causes air to pass from the interior cavity 26 through one end of a channel 34 that communicates with the cavity 26, and into a noisemaking element 40 mounted in the channel 34. Air subsequently passes through the noisemaking element 40 into the chamber 39 and escapes the module 30 through a vent opening 33 formed on the bottom cover 31 of the module 30. As the pet toy re-inflates upon release of the compression force, air re-enters the vent opening 33, passes into the chamber 39, and then back through the noisemaking element 40 into the interior cavity 26.

Referring to FIG. 2, during assembly and after the squeaker module 30 is molded, a noisemaking element 40 may be inserted through each respective passageway or channel 34 for placement within the interior chamber of the module 30. After the noisemaking element(s) have been placed in the channel(s), one of the ends of each channel is closed and sealed as by a plug 37. Accordingly, one end of each noisemaking element communicates with the interior cavity 26 of the pet toy, and the other end of each noisemaking element communicates with the interior chamber 39 of the module 30. FIG. 2 shows a configuration in which two noisemaking elements are rotated 180° with respect to one another so that one channel 34 is located adjacent the plugged end of the other noisemaking element.

FIG. 2 more particularly illustrates an example noisemaking element 40 in the form of a squeaker. As shown, the squeaker includes a tubular shaped housing 50 with a bore 54 forming an open space within the housing 50. A flange 52 provides a supporting structure from which a flexible reed 56 can be mounted. The shape of the flange 52, as well as the size and orientation of the reed 56 can be modified to adjust the pitch of the squeaker. The housing 50 is open at both ends as shown. The end adjacent the flange 52 and reed 56 is shown as having a smaller diameter passageway 60 as compared to the opposite end of the housing 50. A screen 44 covers access through the squeaker 40, and the size and orientation of the gaps in the screen 44 can be adjusted to further optimize desired airflow through the squeaker. As the squeaker is oriented within the module 30 according to FIG. 2, air will pass through the squeaker in a first or primary airflow direction as indicated by directional arrow 62 when the pet toy is compressed. That is, as the pet toy is compressed resulting in a reduction of size of the interior cavity 26, air is forced through the squeaker in a direction from right to left, and the additional air entering the interior chamber 39 of the module 30 is vented to the atmosphere through vent 33. As the pet toy re-inflates, air re-enters the interior chamber 39 through vent 33, and passes through the squeaker as indicated by the directional arrow 64, which defines a second or opposite air flow direction. Accordingly, the air will pass through the squeaker and back into the interior cavity 26 causing the cavity to re-inflate.

Also referring to FIGS. 3 and 4 in the illustrated embodiment, two noisemaking elements 40 are mounted within the interior chamber 39 of the module 30. The noisemaking elements are shown as being of different size to signify that the noisemaking elements can produce distinct sounds. For example, noisemaking elements in the form of squeakers may have a different threshold air flow requirement in order to produce a desired sound, such as a sound with a distinct pitch or volume. FIG. 3 also illustrates channel covers 42 that further protect the noisemaking elements and hold the elements within the corresponding channels 34. The channel covers 42 can be integrally molded with the other elements of the module 30, or the channel covers can be separate pieces that snap-on or are glued to the top wall 38 at the channels 34. FIG. 4 shows the channel covers 42 removed to illustrate the orientation of the noisemaking elements 40 and as shown, the noisemaking elements are spaced from one another and mounted against the inner surface of the top wall 38. It is further noted that the fragmentary cross sectional view of FIG. 1 does not shown the covers 42 and does not show interior details for the noisemaking elements 40 for purposes of clarity in this drawing to better illustrate the basic positioning and arrangement of the housings 50 as they are oriented within the chamber 39.

The channel covers 42 can also be used to frictionally hold the noisemaking elements against the top wall 38. The channels or grooves 34 are formed in the top wall 38 and are sized to receive the noisemaking elements 40. Alternatively, the channels or grooves 34 could be formed on the sidewall 36 for mounting of the noisemaking elements in an alternate position. The channels 34 includes additional space adjacent each opposite end of the corresponding noisemaking element as shown to further accommodate airflow through the noisemaking elements to reduce interference from the sidewall or top wall from which the channels are formed.

The pet toy 10 can be made from a single molded piece with the exception of the noisemaking elements 40 which can be placed in the mold for each toy prior to a molding process. Alternatively, the body of the toy can be a single molded piece, and the module 30 another molded piece that is secured to the body after molding of the body. In the latter case, the noisemaking elements can be secured to the module 30 by sliding the noisemaking elements through the respective channels 34, and then attaching the screens 44. Preferably, the pet toy is made from a resilient thermoplastic or rubber that can withstand repeated biting actions by an animal, yet the toy remain flexible and elastic enough to allow deflection of the toy so that air can pass through the toy without requiring excessive force.

Although the noisemaking elements are illustrated as spaced from one another and oriented substantially parallel in FIGS. 3-4, these elements can be mounted within the module 30 in other configurations, which may depend upon the size of the noisemaking elements, and a particular geometry of the module that best accommodates air flow through the noisemaking elements. As best seen in FIG. 1, the centers of the bores 54 of the noisemaking elements 40 reside within the interior chamber 39 at a distance such that the bores 54 are not shielded by or interfered with by the sidewalls 36 or top wall 38. Accordingly, air can easily pass through the noisemaking elements 40 as oriented.

When two or more noisemaking elements are installed in the housing of the module 30, the air flow paths can be configured in series or in parallel. For example, a parallel arrangement of a pair of squeakers for a parallel flow path can be provided by arranging the squeakers such that each squeaker has a channel 34 that communicates with the interior cavity 26 so that when pressure is applied to deflect the exterior surface of the toy, air is forced through the channels 34, through both squeakers, and then into the chamber 39. A series arrangement of a pair of squeakers for a series flow path can be provided by arranging the squeakers such that only one of the squeakers has a passageway or channel 34 that communicates with the cavity 26, and the other squeaker communicates only with the interior chamber 39 of the module 30. In this later example, upon deflection of the outer surface of the pet toy, air flows from the cavity 26, through the single channel 34 and through the squeaker mounted in the channel. As air pressure rises in the interior chamber 39 of the module, it will escape through the vent opening 33, and some of the air will also pass through the other squeaker mounted within the chamber. In yet another example of a series flow path, a single channel 34 can be configured so that the squeakers are placed end to end within the single channel, and therefore all air entering and leaving the interior cavity 26 passes through the serially arranged squeakers in the single channel. These varying arrangements of the noisemaking elements can be used to produce an array of different sounds in which variable air flows through the noisemaking elements is used to determine the desired group of sounds to be produced.

According to a method of the invention, a pet toy is selectively activated and deactivated to produce desired sounds. The pet toy incorporates one or more noisemaking elements that produce sound when air flows through the noisemaking elements. Air flow is generated by a sufficient force applied to the pet toy to compress or alter the shape of the pet toy causing air to flow through the noisemaking elements as air escapes the pet toy. As the pet toy re-inflates, a second flow of air is generated through the pet toy, which causes the noisemaking elements to again produce sound. Assuming that sufficient and differential forces are applied to the toy, at least four different and unique tones can be produced: two tones caused by air flowing through a respective pair of noisemaking elements when the toy is compressed, and two additional tones caused by air flowing back through the respective pairs of noisemaking elements when the toy re-inflates. In addition to control of different combinations of tones, the volume of sound produced by the noisemaking elements may also be selectively controlled by choosing designs that produce variable sound volumes based upon the flow rate of air traveling through the noisemaking elements. In a preferred embodiment, the noisemaking elements are squeakers.

The invention has been described with respect to one or more preferred embodiments. It shall be understood however that the invention is not specifically limited to these described embodiments, and the invention should therefore be considered in connection with the scope of the claims appended hereto.

What is claimed is:

1. A pet toy comprising:
a body having an exterior surface and a hollow interior cavity;
a module mounted in said interior cavity, said module including a sidewall and a top wall defining a housing and an interior chamber disposed within said housing;
a cover forming a portion of the exterior surface of said body, said cover having a vent opening communicating with said interior chamber of said housing; and
at least one noisemaking element secured to and held against one of said sidewall and said top wall within said module, said noisemaking element being arranged so that a flow of air can pass through said noisemaking element to produce sound when a force is applied to said body.

2. A pet toy, as claimed in claim 1, further comprising a channel formed in either said sidewall or top wall to hold said at least one noisemaking element therein.

3. A pet toy, as claimed in claim 2, wherein:
said channel includes additional space adjacent each opposite end of said noisemaking element to further accommodate airflow through the noisemaking element to reduce interference from the sidewall or top wall from which said channel is formed.

4. A pet toy, as claimed in claim 2, further including:
a channel cover mounted over said channel within said interior chamber of said module to frictionally secure said at least one noisemaking element therein, wherein said channel cover is arranged between said noisemaking element and said cover of said body.

5. A pet toy, as claimed in claim 2, wherein:
said channel includes two channels, and said at least one noisemaking element includes two noisemaking elements, one noisemaking element placed in each corresponding channel.

6. A pet toy, as claimed in claim 5, wherein:
said two channels each communicate with said interior cavity such that when the force is applied to said body, air can pass through each of said two noisemaking elements in parallel.

7. A pet toy, as claimed in claim 6, wherein:
a first directional flow path is provided for flow of air through said pet toy to produce sound, said first directional flow path defined by air within said interior cavity flowing from said interior cavity of said body through each of said two noisemaking elements into said interior chamber of said module, and then through said vent opening; and
a second directional flow path is provided for flow of air through said pet toy to produce sound, said second directional flow path defined by air flowing in an opposite direction through said vent opening from the atmosphere into said interior chamber of said module, and then through each of said two noisemaking elements into said interior cavity of said body.

8. A pet toy, as claimed in claim 7, wherein:
a first sound is produced by activation of said pet toy when force is applied to deflect or deform said exterior surface causing air to flow along said first directional flow path.

9. A pet toy, as claimed in claim 7, wherein:
a second sound is produced by activation of said pet toy when force is applied to deflect or deform said exterior surface causing air to flow along said second directional flow path.

10. A pet toy, as claimed in claim 1, wherein:
said body has a shape resembling a selected animal.

11. A pet toy, as claimed in claim 10, wherein:
said selected animal is a turtle, and said body further includes features resembling features of said turtle including a portion of said body forming a shell.

12. A pet toy, as claimed in claim 11, wherein:
said shell includes a plurality of irregular shaped protrusions formed thereon and a plurality of grooves extending between said protrusions.

13. A pet toy, as claimed in claim 1, wherein:
a first sound is produced by activation of said pet toy when force is applied to deflect or deform said exterior surface causing air to flow through said at least one noisemaking element.

14. A pet toy, as claimed in claim 13, wherein:
said at least one noisemaking element includes two noisemaking elements that are each fixedly mounted within said module, and a second sound is produced by activation of said pet toy when force is applied to deflect or deform said exterior surface causing air to flow through both said noisemaking elements.

15. A pet toy comprising:
a body having an exterior surface and a hollow interior cavity;
a module mounted in said cavity, said module having an interior chamber disposed within said interior cavity of said body;
a first channel and a second channel formed within said module;
a cover forming a portion of the exterior surface of said body, said cover having a vent opening communicating with said interior chamber of said module;
a first noisemaking element secured to and mounted within said first channel of said module; and
a second noisemaking element secured to and mounted within said second channel of said module, said first and second noisemaking elements being arranged so that a flow of air can pass through said noisemaking elements to produce sounds when a force is applied to said body;
wherein a first directional flow path is provided for flow of air through said pet toy to produce sound, said first directional flow path defined by air within said interior cavity flowing from said interior cavity of said body through at least one of said first and second noisemaking elements into said interior chamber of said module, and then through said vent opening; and
a second directional flow path is provided for flow of air through said pet toy to produce sound, said second directional flow path defined by air flowing in an opposite direction through said vent opening from the atmosphere into said interior chamber of said module, and then through at least one of said first and second noisemaking elements into said interior cavity of said body.

16. A pet toy, as claimed in claim 15, wherein:
said module further includes a sidewall and a top wall defining a housing of said module, said first and second channels formed in either said sidewall or top wall to hold said first and second noisemaking elements therein.

17. A pet toy, as claimed in claim 16, wherein:
said first and second channels each include additional space adjacent each opposite end of said first and second noisemaking elements to further accommodate airflow through the noisemaking elements to reduce interference from the sidewall or top wall from which said first and second channels are formed.

18. A pet toy, as claimed in claim 16, further including:
a first channel cover mounted over said first channel to further secure said first noisemaking element therein; and
a second channel cover mounted over said second channel to further secure said second noisemaking element therein, wherein said first and second channel covers are positioned at least partially between said first and second noisemaking elements and said cover of said body.

19. A pet toy, as claimed in claim 15 wherein:
each of said first and second channels communicates with said interior cavity of said body such that one end of each noisemaking element communicates directly with the interior cavity and the other end of each noisemaking element communicates directly with the interior chamber.

20. A method for selectively activating and deactivating a pet toy to produce sound, said method comprising:
providing a pet toy including:
  (i) a body having an exterior surface and a hollow interior cavity;
  (ii) a module mounted in said cavity, said module defining a housing and an interior chamber disposed within said housing;
  (iii) a bottom cover forming a portion of the exterior surface of said body, said bottom cover having a vent opening communicating with said interior chamber of said housing; and
  (iv) at least one noisemaking element frictionally secured to and mounted within said module with a channel cover such that said noisemaking element is separated from said bottom cover;
applying force to said exterior surface of said pet toy to deflect or deform the exterior surface; and
generating a flow of air through said pet toy in response to said applying step, wherein said noisemaking element is arranged so that the flow of air passes through said noisemaking element to produce sound.

21. A method, as claimed in claim 20, wherein:
a first directional flow path is provided for flow of air through said pet toy to produce a first sound, said first directional flow path defined by air within said interior cavity flowing from said interior cavity of said body through said at least one noisemaking element into said interior chamber of said module, and then through said vent opening; and
a second directional flow path is provided for flow of air through said pet toy to produce a second sound, said second directional flow path defined by air flowing in an opposite direction through said vent opening from the atmosphere into said interior chamber of said module, and then through said at least one noisemaking element into said interior cavity of said body.

22. A method, as claimed in claim 20, wherein:
a first sound is produced by activation of said pet toy in response to said applying step.

23. A method, as claimed in claim 22, wherein:
said at least one noisemaking element includes two noisemaking elements, and a second sound is produced by activation of said pet toy when force is applied to deflect or deform said exterior surface causing air to flow through both said noisemaking elements.

24. A pet toy, comprising:
a body having an exterior surface and a hollow interior cavity;
a module mounted in said interior cavity, said module defining a housing and an interior chamber disposed within said housing;
a vent opening communicating with said interior chamber of said housing;
two noisemaking elements arranged within said module;
a first directional flow path provided for flow of air through said pet toy to produce sound, said first directional flow path defined by air within said interior cavity flowing from said interior cavity of said body through each of said two noisemaking elements into said interior chamber of said module, and then through said vent opening; and
a second directional flow path provided for flow of air through said pet toy to produce sound, said second directional flow path defined by air flowing in an opposite direction through said vent opening from the atmosphere into said interior chamber of said module, and then through each of said two noisemaking elements into said interior cavity of said body.

25. A pet toy, as claimed in claim 24, further comprising:
a bottom cover forming a portion of the exterior surface of said body, said bottom cover including said vent opening communicating with said interior chamber of said housing.

* * * * *